US008010108B2

(12) United States Patent
Randall et al.

(10) Patent No.: US 8,010,108 B2
(45) Date of Patent: Aug. 30, 2011

(54) RADIO LINK HANDOVER IN A CELLULAR COMMUNICATION SYSTEM

(75) Inventors: Peter P. Randall, Swindon (GB); Walter Featherstone, Swindon (GB)

(73) Assignee: Motorola Mobility, Inc., Libertyville, IL (US)

( * ) Notice: Subject to any disclaimer, the term of this patent is extended or adjusted under 35 U.S.C. 154(b) by 495 days.

(21) Appl. No.: 11/995,157

(22) PCT Filed: Jun. 23, 2006

(86) PCT No.: PCT/US2006/024497
§ 371 (c)(1),
(2), (4) Date: Jun. 23, 2008

(87) PCT Pub. No.: WO2007/030185
PCT Pub. Date: Mar. 15, 2007

(65) Prior Publication Data
US 2009/0163207 A1    Jun. 25, 2009

(30) Foreign Application Priority Data

Sep. 6, 2005  (GB) .................................. 0518207.6

(51) Int. Cl.
*H04W 36/00*  (2009.01)
*H04B 1/38*   (2006.01)
(52) U.S. Cl. ...................................... 455/436; 455/561
(58) Field of Classification Search .................. 455/561, 455/450, 436–443; 370/230, 235, 335, 331, 370/328, 338, 341–342
See application file for complete search history.

(56) References Cited

U.S. PATENT DOCUMENTS

| | | | |
|---|---|---|---|
| 5,590,172 A | 12/1996 | Lodwig et al. | |
| 6,725,039 B1 | 4/2004 | Parmar et al. | |
| 7,126,936 B2 * | 10/2006 | Herrmann et al. | 370/350 |
| 7,397,790 B2 * | 7/2008 | Zeira et al. | 370/352 |
| 7,433,337 B2 * | 10/2008 | Chao et al. | 370/331 |
| 7,773,561 B2 * | 8/2010 | Kezys et al. | 370/331 |
| 2002/0048266 A1 | 4/2002 | Choi et al. | |
| 2003/0086395 A1 * | 5/2003 | Shanbhag | 370/331 |
| 2003/0224744 A1 | 12/2003 | Sternberg | |
| 2005/0207374 A1 * | 9/2005 | Petrovic et al. | 370/331 |
| 2006/0039296 A1 * | 2/2006 | Nakamata et al. | 370/252 |
| 2006/0116118 A1 * | 6/2006 | Charriere et al. | 455/423 |
| 2006/0209686 A1 * | 9/2006 | Wigard et al. | 370/229 |

* cited by examiner

*Primary Examiner* — Brandon J Miller (57) ABSTRACT

A base station (109) of a cellular communication system (100) comprises an RNC interface (301) which receives a radio link handover initiation message for a radio link from a radio network controller (113). A switch delay processor (309) determines a handover switch delay and a characteristics processor (311) sets a characteristic of a radio link handover acknowledge message in response to the handover switch delay. A message generator (313) generates a radio link handover acknowledge message and transmits this to the radio network controller (113). The radio network controller (113) comprises an RNC handover controller (125) which determines a radio link handover switch time in response to the characteristic. A better timing of the radio link handover may be achieved. The invention may e.g. be applicable to an HSDPA (High Speed Downlink Packet Access) service of a UMTS (Universal Mobile Telecommunication System) cellular communication system and may reduce the amount of data discarded from buffers during an HSDPA handover.

9 Claims, 5 Drawing Sheets

RADIO LINK HANDOVER IN A CELLULAR COMMUNICATION SYSTEM

FIELD OF THE INVENTION

The invention relates to radio link handover in a cellular communication system and in particular, but not exclusively, to timing of handovers in a $3^{rd}$ generation cellular communication system.

BACKGROUND OF THE INVENTION

In a cellular communication system, a geographical region is divided into a number of cells served by base stations. The base stations are interconnected by a fixed network which can communicate data between the base stations. A mobile station is served via a radio communication link from the base station of the cell within which the mobile station is situated.

A typical cellular communication system extends coverage over an entire country and comprises hundreds or even thousands of cells supporting thousands or even millions of mobile stations. Communication from a mobile station to a base station is known as the uplink, and communication from a base station to a mobile station is known as the downlink.

The fixed network interconnecting the base stations is operable to route data between any two base stations, thereby enabling a mobile station in a cell to communicate with a mobile station in any other cell. In addition, the fixed network comprises gateway functions for interconnecting to external networks such as the Internet or the Public Switched Telephone Network (PSTN), thereby allowing mobile stations to communicate with landline telephones and other communication terminals connected by a landline. Furthermore, the fixed network comprises much of the functionality required for managing a conventional cellular communication network including functionality for routing data, admission control, resource allocation, subscriber billing, mobile station authentication etc.

The most ubiquitous cellular communication system is the 2nd generation communication system known as the Global System for Mobile communication (GSM). GSM uses a technology known as Time Division Multiple Access (TDMA) wherein user separation is achieved by dividing frequency carriers into 8 discrete time slots, which individually can be allocated to a user. Further description of the GSM TDMA communication system can be found in 'The GSM System for Mobile Communications' by Michel Mouly and Marie Bernadette Pautet, Bay Foreign Language Books, 1992, ISBN 2950719007.

Currently, 3rd generation systems are being rolled out to further enhance the communication services provided to mobile users. The most widely adopted 3rd generation communication systems are based on Code Division Multiple Access (CDMA) technology. Both Frequency Division Duplex (FDD) and Time Division Duplex (TDD) techniques employ this CDMA technology. In CDMA systems, user separation is obtained by allocating different spreading and scrambling codes to different users on the same carrier frequency and in the same time intervals. In TDD, additional user separation is achieved by assigning different time slots to different users similarly to TDMA. However, in contrast to TDMA, TDD provides for the same carrier frequency to be used for both uplink and downlink transmissions. An example of a communication system using this principle is the Universal Mobile Telecommunication System (UMTS). Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876.

In a 3rd generation cellular communication system, the communication network comprises a core network and a Radio Access Network (RAN). The core network is operable to route data from one part of the RAN to another, as well as interfacing with other communication systems. In addition, it performs many of the operation and management functions of a cellular communication system, such as billing. The RAN is operable to support wireless user equipment over a radio link of the air interface. The RAN comprises the base stations, which in UMTS are known as Node Bs, as well as Radio Network Controllers (RNC) which control the base stations and the communication over the air interface.

The RNC performs many of the control functions related to the air interface including radio resource management and routing of data to and from appropriate base stations. It further provides the interface between the RAN and the core network. An RNC and associated base stations are known as a Radio Network Subsystem (RNS).

3rd generation cellular communication systems have been specified to provide a large number of different services including efficient packet data services. For example, downlink packet data services are supported within the $3^{rd}$ Generation Partnership Project 3GPP release 5 specifications in the form of the High Speed Downlink Packet Access (HSDPA) service.

In accordance with the 3GPP specifications, the HSDPA service may be used in both Frequency Division Duplex (FDD) mode and Time Division Duplex (TDD) mode.

HSDPA seeks to provide packet access services with a relatively low resource usage and with low latency.

Specifically, HSDPA uses a number of techniques in order to reduce the resource required to communicate data and to increase the capacity of the communication system. These techniques include Adaptive Coding and Modulation (ACM), retransmission with soft combining and fast scheduling performed at the base station.

In HSDPA, transmission code resources are shared amongst users according to their traffic needs. The base station (also known as the Node-B for UMTS) is responsible for allocating and distributing the HSDPA resources amongst the individual calls. In a UMTS system that supports HSDPA, some of the code allocation is performed by the RNC whereas other code allocation, or more specifically, scheduling is performed by the base station. Specifically, the RNC allocates a set of resources to each base station, which the base station can use exclusively for high speed packet services. The RNC furthermore controls the flow of data to and from the base stations. However, the base station is responsible for scheduling HS-DSCH transmissions to the mobile stations that are attached to it, for operating a retransmission scheme on the HS-DSCH channels, for controlling the coding and modulation for HS-DSCH transmissions to the mobile stations and for transmitting data packets to the mobile stations.

In HSDPA, each base station comprises a buffer for temporarily storing data to be transmitted to the mobile stations. Furthermore, HSDPA does not support soft handover and an HSDPA mobile station will at any given point be served by only one base station. When a hard handover occurs from one base station to another, a fixed time instant is determined for the handover. At this time instant, the mobile station switches from being supported by the first base station to being supported by the second base station. However, at the time of the handover, the buffers of the first base station may still comprise data for the mobile station which has not yet been transmitted. Accordingly, this data is merely discarded by the first base station, and retransmission techniques are used to recover the data via the second base station when the handover has taken place.

Although such process can be simple to implement, it tends to provide suboptimal performance. In particular, additional communication resource is used for the communication between the RNC and the two base stations as the discarded data must be transmitted from the RNC to the second base station. Furthermore, the retransmissions required to recover the discarded data results in a gap in the data stream received by the mobile station and can increase transmission delays substantially. For some services, such a gap may be noticeable to the user.

Hence, an improved system for radio link handover would be advantageous and in particular a system allowing increased flexibility, improved handover performance, an improved user experience, reduced resource requirements, reduced complexity and/or a reduced delay would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention, there is provided a base station supporting a radio link handover in a cellular communication system, the apparatus comprising: means for receiving a radio link handover initiation message from a network element for a radio link supporting a communication between the base station and a user equipment; determining means for determining a handover switch delay; setting means for setting a characteristic of a radio link handover acknowledge message in response to the handover switch delay; and means for transmitting the radio link handover acknowledge message to the network element.

The invention may allow an improved radio link handover for a cellular communication system. In particular, a more accurate handover switch time may be determined in response to a handover switch delay determined in a base station. An improved timing of the handover may be achieved which e.g. may reduce the amount of data being discarded from buffers in the base station. A reduced resource consumption and/or reduced complexity may be achieved. Alternatively or additionally, a reduced delay and/or improved user experience may be achieved in some embodiments.

For example, for an HSDPA handover, an improved timing of a hard handover can be achieved resulting in reduced data discard and reduced retransmission activity being required.

The characteristic of the radio link handover acknowledge message may be a transmission characteristic of the transmission of the message or may e.g. be characteristic of the message itself. In particular, it may be a data content of the message.

According to an optional feature of the invention, the setting means are arranged to set a transmission time for the radio link handover acknowledge message in response to the handover switch delay.

This may provide for an improved handover procedure. In particular, it may allow the base station to control or influence the timing of the handover without requiring explicit data to be communicated. The feature may in some embodiments allow introduction without requiring any changes to existing standards and/or may reduce the required modifications to existing systems or standards.

According to an optional feature of the invention, the setting means is arranged to delay transmission of the radio link handover acknowledge message until a buffer level of a buffer for the communication is below a threshold.

This may provide for an improved handover procedure. In particular, it may reduce the amount of data being discarded from a buffer of the base station in connection with a hard handover.

According to an optional feature of the invention, the setting means is arranged to include an indication of the handover switch delay in the radio link handover acknowledge message.

This may provide for an improved handover procedure. In particular, it may provide an efficient and/or accurate communication of information useful for determining a handover switch time.

According to an optional feature of the invention, the setting means is arranged to determine a minimum preferred handover activation time in response to the handover switch delay and to include an indication of the minimum preferred handover activation time in the radio link handover acknowledge message.

This may provide for an improved handover procedure. In particular, it may provide for an efficient procedure for controlling the earliest time at which a handover can occur. This may in particular allow the transmission of suitable amounts of data buffered in the base station before the handover.

According to an optional feature of the invention, the minimum preferred handover activation time indicates a frame number.

This may allow for an efficient communication of the minimum preferred handover activation time and may in particular obviate the need for amendments of existing technical specifications for many cellular communication systems.

According to an optional feature of the invention, the determining means is arranged to determine the handover switch delay in response to a data buffer characteristic for the first communication.

This may provide for an improved handover procedure. In particular, it may allow reduced data amounts to be discarded from the data buffer during a hard handover. The characteristic may for example be a buffer size, a buffer occupancy and/or buffer loading.

According to an optional feature of the invention, the determining means is arranged to determine the handover switch delay in response to a data discard measure of a previous radio link handover for the base station.

This may provide for an improved handover procedure. In particular, it may allow dynamic adjustment of the handover switch delay. For example, if a significant amount of data has been discarded for previous handovers, the parameters may be changed to really provide an increased handover switch delay thereby allowing more buffer data to be transmitted before the handover is executed.

According to an optional feature of the invention, the determining means comprises means for determining the handover switch delay in response to a user input.

This may provide for an improved handover procedure. In particular, it may allow improved control of the handover performance by a network operator.

The network element may a Radio Network Controller.

According to an optional feature of the invention, the cellular communication system is a $3^{rd}$ Generation cellular communication system.

The invention may allow improved handover performance in a $3^{rd}$ Generation cellular communication system and may in particular be compatible with all the technical requirements and preferences of such a system.

According to an optional feature of the invention, the radio link is a Universal Mobile Telecommunication System (UMTS) Terrestrial Radio Access Network (UTRAN) radio link.

The invention may allow improved handover performance in a UMTS cellular communication system and may in particular be compatible with all the technical requirements and preferences of such a system.

According to an optional feature of the invention, the radio link handover initiation message is an NBAP Radio Link Reconfiguration Prepare message.

This may provide improved handover performance while maintaining compatibility with many existing systems including HSDPA systems.

According to an optional feature of the invention, the radio link handover acknowledge message is an NBAP Radio Link Reconfiguration Ready message.

This may provide improved handover performance while maintaining compatibility with many existing systems including HSDPA systems.

According to an optional feature of the invention, the radio link handover is a handover of a High Speed Downlink Packet Access (HSDPA) service.

The invention may allow improved handover performance for HSDPA services and may in particular be compatible with all the technical requirements and preferences of a system supporting such services.

According to another aspect of the invention, there is provided a cellular communication system comprising a base station and a radio network controller arranged to support a radio link handover in a cellular communication system; wherein the base station comprises: means for receiving a radio link handover initiation message from the radio network controller for a radio link supporting a communication between the base station and a user equipment; determining means for determining a handover switch delay; setting means for setting a characteristic of a radio link handover acknowledge message in response to the handover switch delay; means for transmitting the radio link handover acknowledge message to the network element; and the radio network controller comprises:

means for transmitting the radio link handover initiation message to the base station; means for receiving the radio link handover acknowledge message; and means for determining a radio link handover switch time in response to the characteristic.

The invention may provide a cellular communication system with improved handover performance. The cellular communication system may in particular be a third generation cellular communication system, such as UMTS, and may specifically support an HSDPA service.

According to an optional feature of the invention, the radio link handover switch time is indicative of a time at which the radio link handover is to be executed.

The invention allows for an improved optimisation of the timing for executing handover.

According to another aspect of the invention, there is provided a method for supporting a radio link handover in a cellular communication system, the method comprising: receiving a radio link handover initiation message from a network element for a radio link supporting a communication between the base station and a user equipment; determining a handover switch delay; setting a characteristic of a radio link handover acknowledge message in response to the handover switch delay; and transmitting the radio link handover acknowledge message to the network element.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF EMBODIMENTS OF THE INVENTION

The following description focuses on embodiments of the invention applicable to a 3rd generation cellular communication system and in particular to a UMTS cellular communication system supporting HSDPA (High Speed Downlink Packet Access) services. However, it will be appreciated that the invention is not limited to this application but may be applied to many other cellular communication systems and services.

Figure 1:
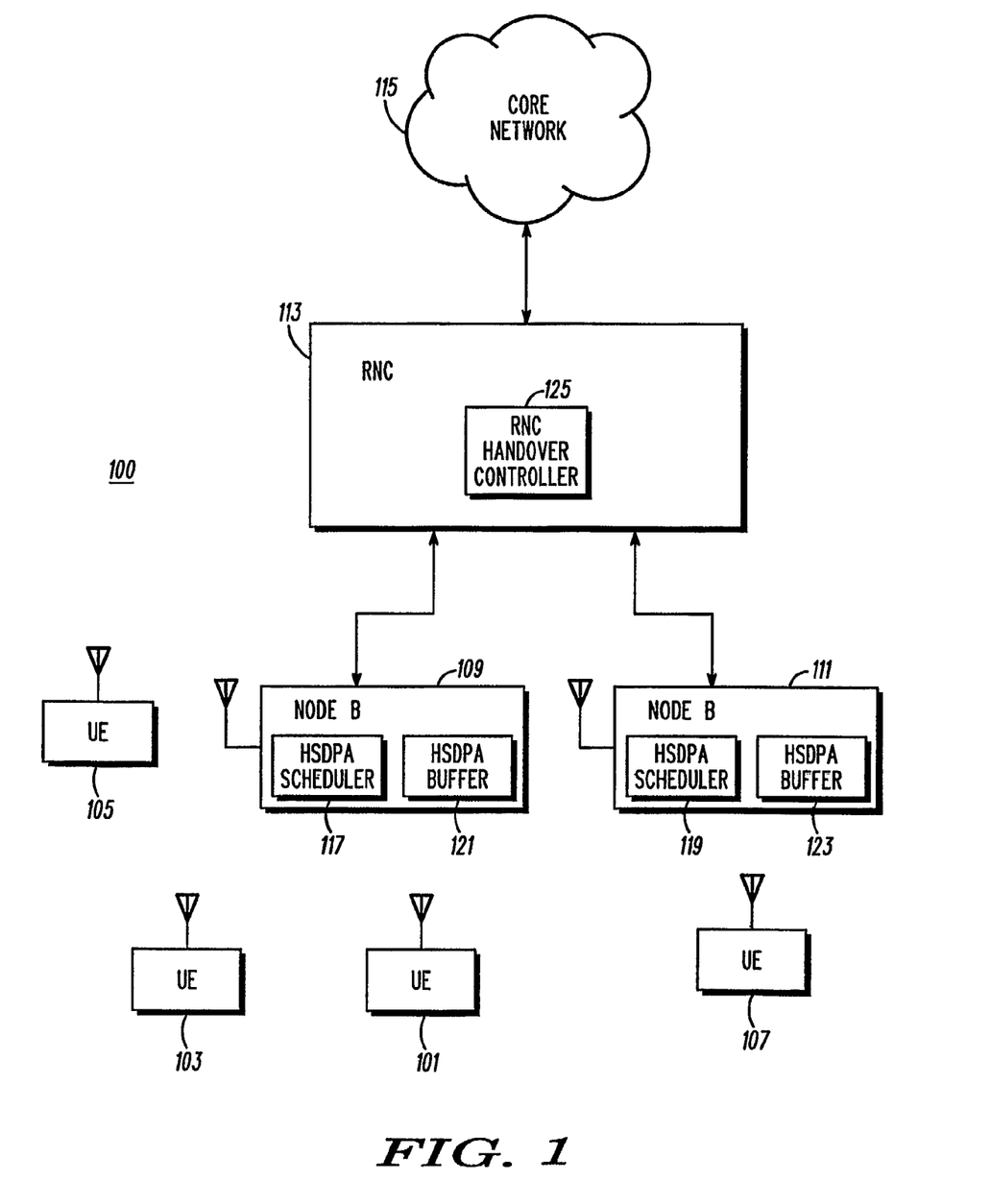
FIG. 1 illustrates elements of a cellular communication system incorporating some embodiments of the invention.

FIG. 1 illustrates elements of a cellular communication system 100 incorporating some embodiments of the invention.

In the example of FIG. 1, user equipments 101, 103, 105, 107 are supported by base stations (node Bs) 109, 111. The base stations 109, 111 are coupled to a Radio Network Controller (RNC) 113 which is coupled to a core network 115 as is typical for UMTS cellular communication systems. In the example of FIG. 1, the user equipments 101, 103, 105 are initially located in a first cell supported by the first base station 109 and the user equipment 107 is located in a second cell supported by the second base station 111. It will be appreciated that although each cell of the current example is supported by a separate base station, individual base stations can in other examples support more than one cell.

For clarity and brevity, FIG. 1 illustrates only aspects of the communication system required to describe exemplary embodiments of the invention. Similarly, only the functionality and features required to describe the embodiments will be described, and it will be apparent to the person skilled in the art that the illustrated elements will be capable of performing other functions and provide features required or desired for the operation of a 3rd Generation cellular communication system as appropriate.

In particular, the user equipments 101-107, base stations 109, 111, RNC 113 and core network 115 in the system of FIG. 1 comprise the required or desired functionality for operating in accordance with the Technical Specifications of the 3rd Generation Partnership Project (3GPP) for a UMTS cellular communication system as well known to the person skilled in the art.

In HSDPA, the individual base stations schedule the data for communication over the air interface. Typically, the RNC allocates a certain resource allocation for each base station, and the individual base station schedules the data within this resource allocation constraint. Accordingly, the first base station 109 and the second base station 111 each comprise an HSDPA scheduler 117, 119, which schedule the communications for the respective cell.

Each of the base stations 109, 111 furthermore comprise an HSDPA buffer 121, 123 which buffers data received from the RNC 113 for communication over an HSDPA air interface a communication link to a user equipment 101.

In HSDPA, handover operation is controlled by the RNC, and accordingly the RNC 113 comprises an RNC handover controller 125. The RNC handover controller 125 monitors data from the base stations 109, 111, and in particular evaluates measurement data received from the user equipments 101-105 in order to determine if a handover of the HSDPA service is required.

For example, the RNC handover controller 125 can monitor measurement data for an HSDPA service of the first user equipment 101 and can from this determine that a handover from the first base station 109 to the second base station 111 is required.

When the RNC handover controller 125 determines that a handover is required, it initiates a handover procedure wherein it liaises with the first base station 109 and the second base station 111 in order to set up the required communication link and to execute the handover.

In particular, when a user equipment 101 using HSDPA (and specifically the HS-DSCH (High Speed Downlink Shared (transport) Channel) moves between cells (including an intra base station handover), a synchronised Radio Link (RL) Reconfiguration Procedure is used to control the time at which the user equipment's connection is moved from the original cell of the first base station 109 to the new cell of the second base station 111.

Typically communication links to a user equipment of a UMTS cellular communication system can be supported by soft handover wherein connections are simultaneously setup to a plurality of base stations. For example, a user equipment's associated DCH (Dedicated Channel) can have simultaneous connections to several cells. However, in contrast, an HSDPA service user equipment is only assigned to the HS-DSCH of a single cell at a time and cannot be supported by soft handover. Accordingly, any handover of a HS-DSCH must be a hard handover.

Also, in HSDPA, the downlink data is transmitted from the RNC 113 to the base station 109 where it is temporarily stored in the HSDPA buffer 121 until being scheduled by the HSDPA scheduler 117. When the RNC handover controller 125 determines that a handover is to be executed, the RNC 113 proceeds to transmit any new downlink data to the destination base station 111 where it is stored in the HSDPA buffer 123 of this base station 111.

However, if the actual handover occurs before all data of the HSDPA buffer 121 of the first base station 109 has been transmitted to the user equipment 101, the remaining data is simply discarded and will not be transmitted to the first user equipment 101 by the first base station 109. Furthermore, as this data has not been forwarded to the second base station 111, it will not initially be transmitted from this base station either. Accordingly, the first user equipment 101 will detect that some data has been lost and will request that this is retransmitted. The second base station 111 will thus receive the discarded data from the RNC 113 for transmission to the first user equipment 101.

Thus, large amounts of data can be discarded by the first base station 109 requiring retransmission techniques to ensure that the data is transmitter. This leads to an inefficient resource utilisation of the limited communication resource for the link between the RNC 113 and the base station 111. It can furthermore reduce the effective throughput and lead to delay and a quality of service degradation.

The standard procedure for HSDPA is for the RNC 113 to forward as much data (Radio Link Control (RLC) frames) as possible to the cell for transmission in order to ensure that there is sufficient data at the cell to fully utilise the available channel bandwidth. However, this can further exacerbate the disadvantages.

Figure 2A:
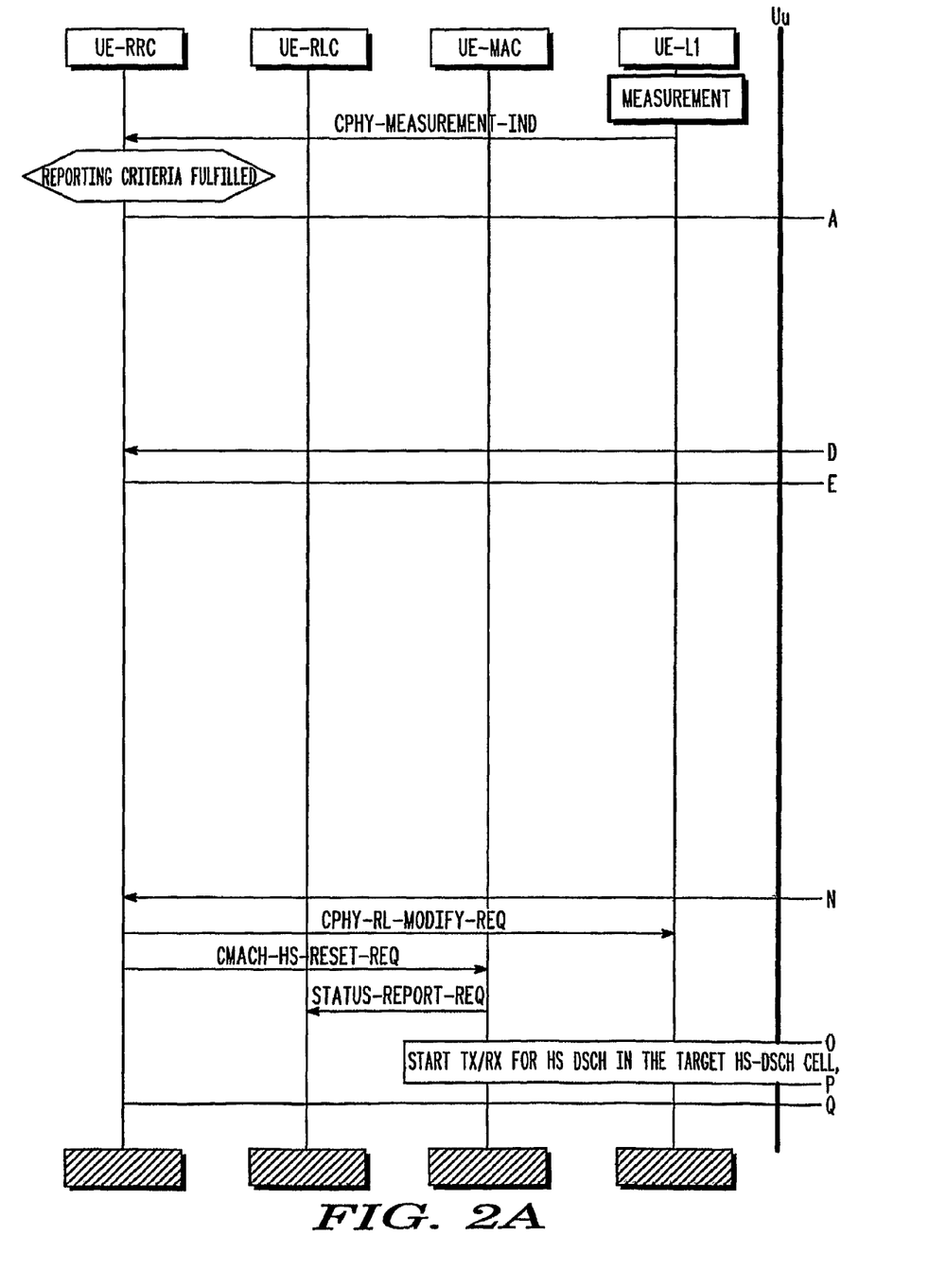
FIG. 2 illustrates an example of a signalling flow for an HSDPA handover.
Figure 2B:
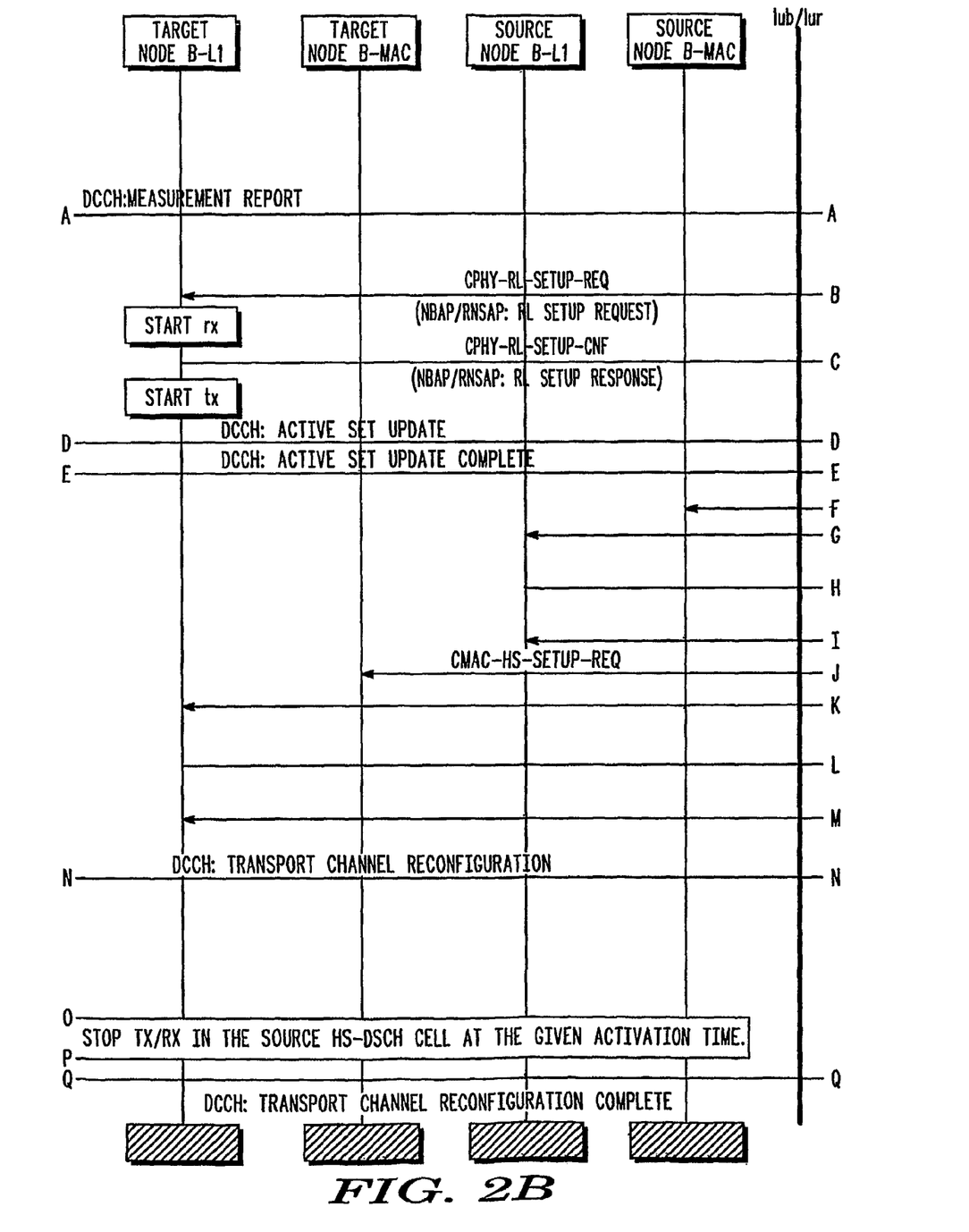
Figure 2C:
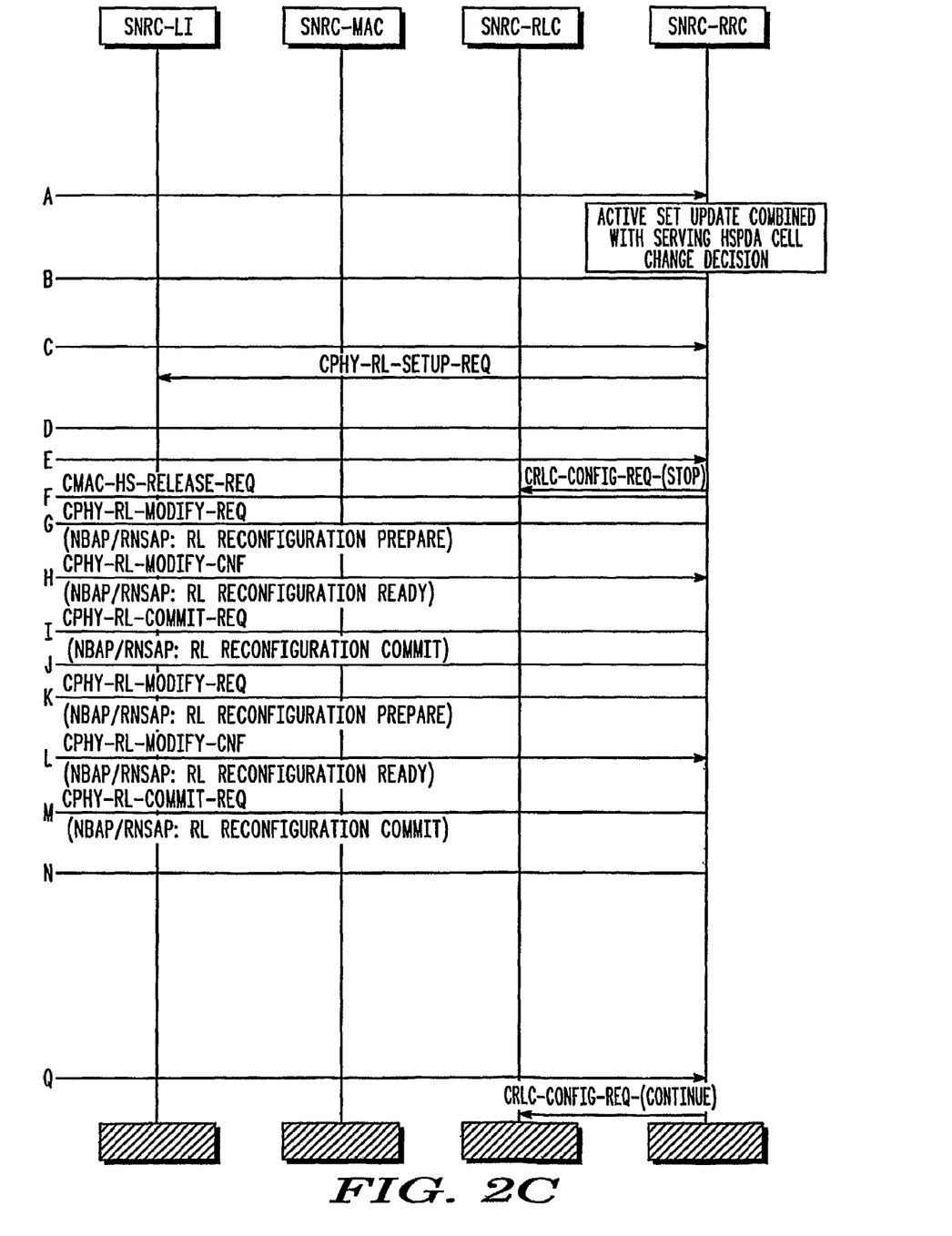

FIG. 2 illustrates an example of a signalling flow for an HSDPA handover. The example is compatible with the Technical Specifications for the UMTS cellular communication system and is specifically listed as an example in the Technical Specification TS 25.308 as will be well known to the person skilled in the art.

Specifically, FIG. 2 illustrates an example of an inter-base station handover of an HS-DSCH performed subsequent to an active set update.

Initially, the RNC 113 establishes the new radio link in the target base station 111 for the dedicated physical channels and transmits an ACTIVE SET UPDATE message to the user equipment 101. The ACTIVE SET UPDATE message includes the necessary information for establishment of the dedicated physical channels in the added radio link. When the user equipment 101 has added the new radio link, it returns an ACTIVE SET UPDATE COMPLETE message.

The RNC 113 will now carry on with the next step of the procedure, which is the serving HS-DSCH cell change. The target HS-DSCH cell (of the second base station 111) is the newly added radio link, so far only including dedicated physical channels. For the synchronised serving HS-DSCH cell change, both the source and target base stations 109, 111 are first prepared for execution of the handover at the activation time indicated with the CPHY-RL-Commit-REQ primitive.

The RNC 113 then sends a TRANSPORT CHANNEL RECONFIGURATION message, which indicates the target HS-DSCH cell and the activation time to the user equipment 101. The message can also include a configuration of transport channel related parameters for the target HS-DSCH cell, including an indication to reset the MAC-hs entity, and a status report for each RLC entity associated with the HS-DSCH should be generated.

Since source and target HS-DSCH cell are controlled by different base stations 109, 111, resource allocations in source and target base station 109, 111 need to be released and setup, respectively, which can be done with the CMAC-HS-Release-REQ and CMAC-HS-Setup-REQ primitives. These MAC-hs control primitives are assumed to be carried on the same NBAP/RNSAP messages, which carry the CPHY-RL-Reconfig-REQ primitives. Execution of release and setup of MAC-hs entities shall also be performed at the indicated activation time.

When the user equipment 101 has completed the serving HS-DSCH cell change, it returns a TRANSPORT CHANNEL RECONFIGURATION COMPLETE message to the network."

Thus, as illustrated the RNC handover controller 125 controls the operation of the base stations 109, 111 through the exchange of messages. However, conventionally the RNC handover controller 125 determines the activation (or switch) time for the handover based only on parameters locally available in the RNC 113. This tends to lead to suboptimal results and to an undesirable amount of data being discarded from the HSDPA buffer 121 of the source base station 109.

In the system of FIG. 1, the first base station 109 is arranged such that it can influence the activation time of the handover. Thus, the determination of the activation time for the handover depends not only on parameters and information available at the RNC 113 but also take into account parameters and information available only at the base station 109. In particular, the activation time can be controlled by the source base station 109, such that the data discarded from the HSDPA buffer 121 is reduced.

Figure 3:
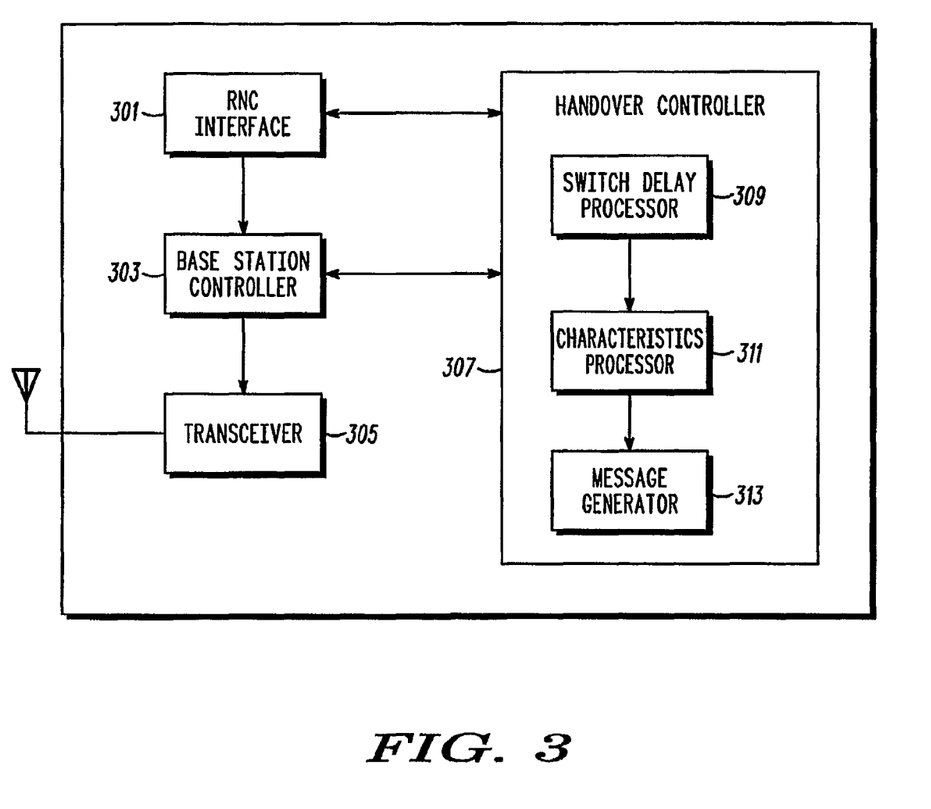
FIG. 3 illustrates a base station in accordance with some embodiments of the invention.

FIG. 3 illustrates the base station 109 in more detail.

The base station 109 comprises an RNC interface 301 which communicates with the RNC 113 over the communication link between the base station 109 and the RNC 113 (the Iub interface).

The RNC interface 301 is coupled to a base station controller 303 which controls the operation of the base station 109. The base station controller 303 is coupled to a transceiver 305 which is operable to transmit and receive communications to and from the user equipment 101, 103, 105 over the air interface in accordance with the Technical Specifications of the UMTS cellular communication system.

The base station 109 furthermore comprises a handover controller 307 which controls the handover performance of the base station 109 and in particular interfaces with the RNC handover controller 125 to execute a handover.

The RNC interface 301 can receive a radio link handover initiation message from the RNC 113. For example, the RNC interface 301 can receive a handover initiation message in the form of a NBAP Radio Link Reconfiguration Prepare message from the RNC 113. The message is forwarded to the handover processor 307 which proceeds to prepare for the execution of the handover.

The handover processor 307 comprises a switch delay processor 309 which is arranged to determine a handover switch delay for the handover. For example, if the first user equipment 101 is to be handed over from the first base station 109 to the second base station 111, a NBAP Radio Link Reconfiguration Prepare message is received from the RNC 113. In response, the switch delay processor 309 proceeds to determine a suitable time for the handover activation or switch from the point of view of the first base station 109.

In particular, the switch delay processor 309 evaluates the current HSDPA buffer state for the HSDPA communication link with the first user equipment 101. It then proceeds to determine a suitable delay before the communication link should be switched from the first base station 109 to the second base station 111.

As a specific example, if the current buffer level is above a first threshold, indicating that there is a large amount of HSDPA data to be transmitted to the first user equipment 101, a fixed large delay can be selected. If the current buffer level is below the first threshold but above a second threshold, indicating that a medium amount of HSDPA data is stored for transmission to the first user equipment 101, another smaller fixed delay can be selected. If the buffer level is below the second threshold, indicating that only a small amount of HSDPA data is stored for transmission, a third even smaller delay can be selected.

Accordingly, the switch delay processor 309 determines a handover switch delay which will allow an increased amount of data stored at the first base station 109 to be transmitted to the first user equipment 101 before the handover is executed. Furthermore, the handover switch delay can dynamically be adjusted to suit the specific conditions at the time of the handover.

The handover controller 307 is arranged to respond to the handover initiation message (which in the specific example is the NBAP Radio Link Reconfiguration Prepare message) by transmitting a radio link handover acknowledge message to the RNC 113.

The switch delay processor 309 is coupled to a characteristics processor 311 which is arranged to set a characteristic of the radio link handover acknowledge message in response to the handover switch delay. The characteristic of the radio link handover acknowledge message that is set can be a transmission characteristic, such as the timing of the transmission, or can be a content characteristic, such as specific data which is included in the message.

The characteristics processor 311 is coupled to a message generator 313 which generates the radio link handover acknowledge message. In the specific example, the radio link handover acknowledge message is an NBAP Radio Link Reconfiguration Ready message. The message is then fed to the RNC interface 301 from where it is transmitted to the RNC 113.

When the radio link handover acknowledge message is received at the RNC 113, the RNC handover controller 125 proceeds to determine a suitable radio link handover switch time (or handover activation time) in response to the characteristic which has been set by the characteristics processor 311. Thus, the RNC handover controller 125 determines the handover switch time in response to the handover switch delay determined in the base station 109.

The determined handover switch time is then communicated from the RNC 113 to both the first base station 109 and the second base station 111. The two base stations 109, 111 then proceed to synchronously execute a handover at the specified handover switch time.

Specifically, the RNC indicates the handover switch time to the base stations 109, 111 in the NBAP Radio Link Reconfiguration Commit message and then indicates the same handover switch time to the user equipment 101 in the RRC Transport Channel Reconfiguration message. When the handover switch time is reached, all three elements swap to the new configuration. Therefore, in the case of the HS-DSCH, the user equipment's connection is dropped from the original cell, since it has been handed over to the new cell and any remaining data buffered at the old cell is discarded. The discard occurs if the activation time does not give the base station 109 sufficient time to empty the HSDPA data buffer. Any data discarded needs to be retransmitted from the RNC 113 through the second base station 111 to the user equipment 101.

However, the system of FIG. 1 provides for an improved determination of the handover switch time which can substantially reduce the amount of data that is discarded. Thus, by taking into consideration local characteristics and conditions at the first base station 109 (which are not available at the RNC 113), and in particular the buffer characteristics, an improved handover performance can be achieved. In particular, a reduced amount of data will be discarded from the first base station 109 thereby reducing the amount of data that needs to be recovered through the use of retransmission techniques.

In some embodiments, the characteristics processor 311 is arranged to set a transmission time for the radio link handover acknowledge message in response to the handover switch delay. Specifically, the characteristics processor 311 can delay the transmission of the radio link handover acknowledge message for a duration which is equivalent to the handover switch delay determined by the switch delay processor 309.

As a specific example, the characteristic processor 311 can control the message generator and/or the RNC interface 301 to not transmit the handover acknowledge message until the buffer level of the HSDPA buffer is below a given specified threshold.

Thus, in such embodiments, the base station 109 can hold up the initial response to the NBAP Radio Link Reconfiguration Prepare message for a sufficient time, so that the HSDPA buffers have enough time to be partially or fully transmitted to the user equipment 101. An advantage of such embodiments is that they can be compatible with many existing systems. Specifically, the technical specifications for the UMTS cellular communication system (and in particular Technical Specification TS 25.433) do not mandate that this response must occur within a set period.

Thus, as the RNC 113 does not proceed to determine the handover switch time until the handover acknowledge message is received from the base station 109, a simple and automatic control of the handover switch time by the base station can be achieved without requiring any modifications to the RNC 113.

Alternatively or additionally, the characteristics processor 311 can be arranged to include an explicit or implicit indication of the handover switch delay in the radio link handover acknowledge message. The indication can specifically be data which is included in the message and which provides information that can be used by the RNC 113 to determine a suitable handover switch time.

As a specific example, the characteristics processor 311 can determine a minimum preferred handover activation (or switch) time in response to the handover switch delay and can include an indication of the minimum preferred handover activation time in the radio link handover acknowledge message. For example, the switch delay processor 309 can determine a frame number for which it is expected that a given amount of the stored data of the HSDPA buffer has been transmitted to the user equipment 101. This frame number can then be included in the handover acknowledge message which is transmitted to the RNC 113. The RNC 113 can accordingly proceed to determine a suitable handover switch time with the constraint that this switch time must be later than the frame indicated by the minimum preferred handover frame number.

Thus, in some such embodiments, a NBAP Radio Link Reconfiguration Ready message could include an information element that informs the RNC 113 that the base station 109 requires a certain amount of time to clear the HSDPA buffer. This data is then used by an algorithm in the RNC 113 to calculate an optimal time for the handover.

As previously mentioned, the handover switch delay can be determined in response to a data buffer characteristic. Specifically, an increasing handover switch delay can be determined for increased loading of the HSDPA buffer 121 used for the HSDPA communication with the first user equipment 101. The handover switch delay can be determined in response to other data buffer characteristics, such as for example a buffer size, a rate of emptying etc.

Furthermore, in some embodiments the handover switch delay can be determined in response to a data discard measure of a previous radio link handover for the base station. For example, if the previous handover of an HSDPA service resulted in a handover switch time being determined which resulted in a large amount of data being discarded, a larger value for the handover switch delay can be determined for future handovers. Thus the switch delay can be dynamically adjusted in response to previous handover operations for HSDPA services. This can result in an improved determination of a handover switch time.

In some embodiments, this switch delay processor 309 can determine the handover switch delay in response to a user input. For example the handover switch delay can be determined in response to operator configurable parameters thereby providing an operator improved control over the HSDPA handover performance.

It will be appreciated that the above description for clarity has described embodiments of the invention with reference to different functional units and processors. However, it will be apparent that any suitable distribution of functionality between different functional units or processors can be used without detracting from the invention. For example, functionality illustrated to be performed by separate processors or controllers can be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention can optionally be implemented at least partly as computer software running on one or more data processors and/or digital signal processors. The elements and components of an embodiment of the invention can be physically, functionally and logically implemented in any suitable way. Indeed the functionality can be implemented in a single unit, in a plurality of units or as part of other functional units. As such, the invention can be implemented in a single unit or can be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments can be combined in accordance with the invention. In the claims, the term comprising does not exclude the presence of other elements or steps.

Furthermore, although individually listed, a plurality of means, elements or method steps can be implemented by e.g. a single unit or processor.

Additionally, although individual features may be included in different claims, these can possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

The invention claimed is:

1. A base station supporting a radio link handover in a cellular communication system, the base station comprising:
    means for receiving a radio link handover initiation message from a network element for a radio link supporting a communication between the base station and a user equipment;
    determining means for determining a handover switch delay;
    setting means for setting a characteristic of a radio link handover acknowledge message in response to the handover switch delay; and
    means for transmitting the radio link handover acknowledge message to the network element;
    wherein the determining means are arranged to determine the handover switch delay in response to a data discard measure of a previous radio link handover for the base station.

2. The base station claimed in claim 1 wherein the setting means are arranged to set a transmission time for the radio link handover acknowledge message in response to the handover switch delay.

3. The base station claimed in claim 1 wherein the setting means are arranged to delay transmission of the radio link handover acknowledge message until a buffer level of a buffer for the communication is below a threshold.

4. The base station claimed in claim 1 wherein the setting means are arranged to include an indication of the handover switch delay in the radio link handover acknowledge message.

5. The base station claimed in claim 1 wherein the setting means are arranged to determine a minimum preferred handover activation time in response to the handover switch delay and to include an indication of the minimum preferred handover activation time in the radio link handover acknowledge message.

6. The base station claimed in claim 5 wherein the minimum preferred handover activation time indicates a frame number.

7. The base station claimed in claim 1 wherein the determining means are arranged to determine the handover switch delay in response to a data buffer characteristic for the communication.

8. The base station claimed in claim 1 wherein the radio link is a Universal Mobile Telecommunication System Terrestrial Radio Access Network radio link, the radio link handover initiation message is an Nobe B Application Part (NBAP) Radio Link Reconfiguration Prepare message, and the radio link handover acknowledge message is an NBAP Radio Link Reconfiguration Ready message.

9. A method for supporting a radio link handover in a cellular communication system, the method comprising:
 receiving a radio link handover initiation message from a network element for a radio link supporting a communication between a base station and a user equipment;
 determining a handover switch delay;
 setting a characteristic of a radio link handover acknowledge message in response to the handover switch delay; and
 transmitting the radio link handover acknowledge message to the network element;
 wherein determining comprises determining the handover switch delay in response to a data discard measure of a previous radio link handover for the base station.

* * * * *